(12) United States Patent
Ho

(10) Patent No.: US 10,333,907 B2
(45) Date of Patent: *Jun. 25, 2019

(54) PAIRWISE TEMPORAL KEY CREATION FOR SECURE NETWORKS

(71) Applicant: TEXAS INSTRUMENTS INCORPORATED, Dallas, TX (US)

(72) Inventor: Jin-Meng Ho, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/866,762

(22) Filed: Jan. 10, 2018

(65) Prior Publication Data

US 2018/0159831 A1   Jun. 7, 2018

Related U.S. Application Data

(63) Continuation of application No. 15/378,573, filed on Dec. 14, 2016, now Pat. No. 9,906,502, which is a (Continued)

(51) Int. Cl.
*H04L 9/08* (2006.01)
*H04L 9/32* (2006.01)
*H04L 29/06* (2006.01)

(52) U.S. Cl.
CPC ........ *H04L 63/0428* (2013.01); *H04L 9/0844* (2013.01); *H04L 9/0869* (2013.01); *H04L 9/3242* (2013.01); *H04L 63/061* (2013.01)

(58) Field of Classification Search
CPC ... H04L 63/061; H04L 63/123; H04L 9/0844; H04L 9/0869; H04L 9/3242
See application file for complete search history.

(56) References Cited

U.S. PATENT DOCUMENTS 7,395,427 B2 * 7/2008 Walker .................. H04L 63/061
                                                         455/410
2005/0050004 A1   3/2005 Sheu et al.
(Continued)

OTHER PUBLICATIONS

Davenport, MedWIN MAC and Security Proposal—Documentation, IEEE P802.15, May 4, 2009, 85 pages.
Loa et al., Management Message Integrity Check for Mulit-hop Relay System, 2007, retrieved from the internet <URL: ieee802.org/16relay/contrib/C80216j-07_069.pdf>, pp. 1-19 as printed.
(Continued)

*Primary Examiner* — Tae K Kim
(74) *Attorney, Agent, or Firm* — Tuenlap Chan; Charles A. Brill; Frank D. Cimino

(57) ABSTRACT

A system and method for establishing a pairwise temporal key (PTK) between two devices based on a shared master key and using a single message authentication codes (MAC) algorithm is disclosed. The devices use the shared master key to independently compute four MACs representing the desired PTK, a KCK, and a first and a second KMAC. The Responder sends its first KMAC to the Initiator, which retains the computed PTK only if it verifies that the received first KMAC equals its computed first KMAC and hence that the Responder indeed possesses the purportedly shared master key. The Initiator sends a third message including the second KMAC to the Responder. The Responder retains the computed PTK only if it has verified that the received second KMAC equals its computed second KMAC and hence that the Initiator indeed possesses the purportedly shared master key.

22 Claims, 4 Drawing Sheets

Related U.S. Application Data continuation of application No. 14/593,628, filed on Jan. 9, 2015, now Pat. No. 9,560,024, which is a continuation of application No. 12/697,080, filed on Jan. 29, 2010, now Pat. No. 8,966,265.

(60) Provisional application No. 61/148,634, filed on Jan. 30, 2009.

(56) References Cited

U.S. PATENT DOCUMENTS

| | | | |
|---|---|---|---|
| 2006/0126847 A1 | 6/2006 | Ho | |
| 2007/0097934 A1* | 5/2007 | Walker | H04L 63/0428 370/338 |
| 2008/0063204 A1* | 3/2008 | Braskich | H04L 9/0836 380/270 |
| 2008/0063205 A1* | 3/2008 | Braskich | H04L 63/0892 380/270 |
| 2009/0268914 A1* | 10/2009 | Singh | H04L 9/0822 380/279 |

OTHER PUBLICATIONS

NIST, Establishing Wireless Robust Security Networks: A Guide to IEEE 802.11i, 2007, Retrieved from the Internet <URL: csrc.nist.gov/publications/nistpubs/800-97/SP800-97.pdf>, pp. 1-9 as printed.

Frankel et al: NIST—Establish Wireless Robust Security Networks: A Guide to IEE 802.11i; 2007; Retrieved from the Internet<URL:csrc.nist.gov/publications/nistpubs/800-97/SP800-97.pdf.> pp. 1-62 as printed.

* cited by examiner

PAIRWISE TEMPORAL KEY CREATION FOR SECURE NETWORKS

CROSS-REFERENCE TO RELATED APPLICATIONS

Under 35 U.C.S. §§ 119(e), 120, this continuation application claims priority to and benefits of U.S. application Ser. No. 15/378,573, filed January Dec. 14, 2016, which is a continuation of U.S. application Ser. No. 14/593,628, filed Jan. 9, 2015, which is a continuation of U.S. application Ser. No. 12/697,080, filed Jan. 29, 2010, which claims the benefit of Provisional Patent Application No. 61/148,634, which is titled "Pairwise Temporal Key Creation for Secure Networks" and was filed Jan. 30, 2009, the entireties of which are hereby incorporated herein by reference.

TECHNICAL FIELD

Embodiments of the invention are directed, in general, to network security and, more specifically, to generating a session key from a master key for securing communications between two devices.

BACKGROUND

Message exchanges between two or more parties in a wireless network or over the Internet are vulnerable to eavesdropping and manipulation by other parties. Security is required to protect the confidentiality and integrity of the message exchanges. Typically, messages are protected through encrypting and authenticating the messages with a shared session key, as referred to as pairwise temporal key (PTK) hereinafter, between the intended parties. A shared session key is often derived from a shared master key that is rarely used and tightly guarded against potential compromise.

As its name implies, a session key or a temporal key is typically used for a limited period of time, such as during a single communications session between two devices. Accordingly, a new session key is typically generated for each new communication session between the devices. It is important that the session key can be generated quickly and with minimum computations so that each communication session can be easily established.

Existing session key computation methods require involved message formatting and computation to generate the session key and the confirmation key and key message authentication codes (KMAC) that are used during the session key generation procedure. Therefore, a procedure for computing session keys that minimizes the required formatting and computation yet still provides adequate security strength is needed.

SUMMARY OF THE INVENTION

Embodiments of the invention provide a protocol, algorithm, and encoding for creating a pairwise temporal key (PTK), i.e., a session key, based on a shared master key (MK) between two devices. The invention uses a single message authentication code (MAC) algorithm to compute message authentication codes (MAC) representing the keying parameters of the session key generation procedure. The keying parameters include the PTK to be generated, as well as the key confirmation key (KCK) and key message authentication codes (KMAC) that are needed during the PTK generation procedure. In one embodiment, a keyed-hash message authentication code (HMAC) algorithm is used as the MAC algorithm. In another embodiment, a cipher-based message authentication code (CMAC) algorithm is used as the MAC algorithm. Accordingly, the solutions described herein reduce computation requirements and provide implementation flexibility.

A system and method for establishing a pairwise temporal key (PTK) between two devices based on a shared master key and using a single MAC algorithm is disclosed. One device (Initiator) sends a first message to the other device (Responder), the Responder sends a second message to the Initiator, and the Initiator sends a third message to the Responder. Each of the devices independently computes a first MAC and a second MAC representing the desired PTK and a KCK, respectively, and further computes a third and a fourth MAC representing a first and a second KMAC, respectively. The computations use the shared master key and the first and second messages sent or received. The Responder includes its first KMAC in the second message, and the Initiator includes its second KMAC in the third message. The Initiator sends its third message and retains the computed PTK only if it has verified that the received first KMAC equals its computed first KMAC and hence that the Responder indeed possesses the purportedly shared master key. The Initiator sends to the Responder a third message which includes the second KMAC. The Responder retains the computed PTK only if it has verified that the received second KMAC equals its computed second KMAC and hence that the Initiator indeed possesses the purportedly shared master key. With the shared PTK, the two devices can secure their subsequent communications to ensure message integrity and confidentiality. In one embodiment, a keyed-hash message authentication code (HMAC) algorithm is used as the MAC algorithm. In another embodiment, a cipher-based message authentication code (CMAC) algorithm is used as the MAC algorithm.

BRIEF DESCRIPTION OF THE DRAWINGS

Figure 1:
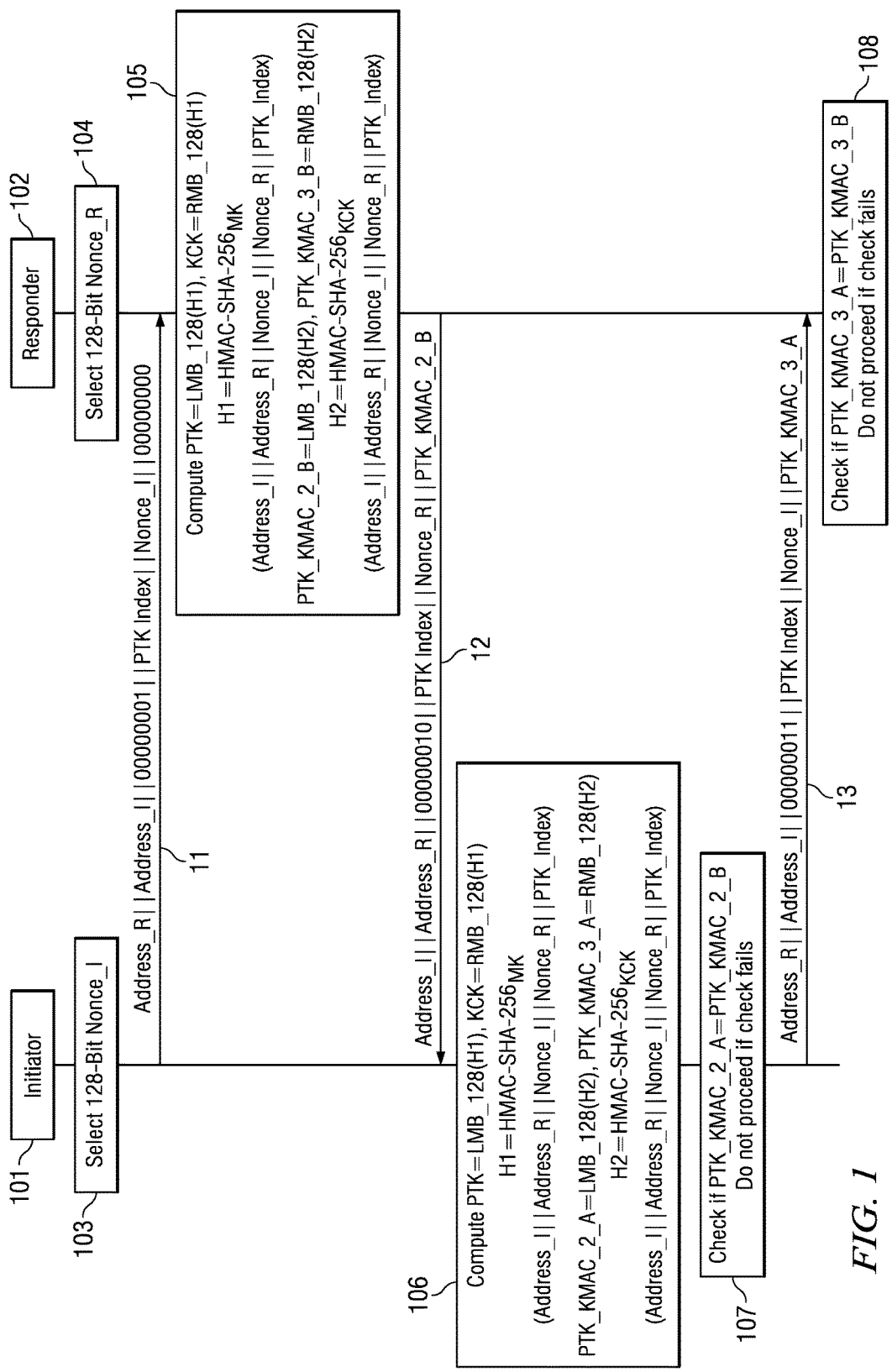
Figure 2:
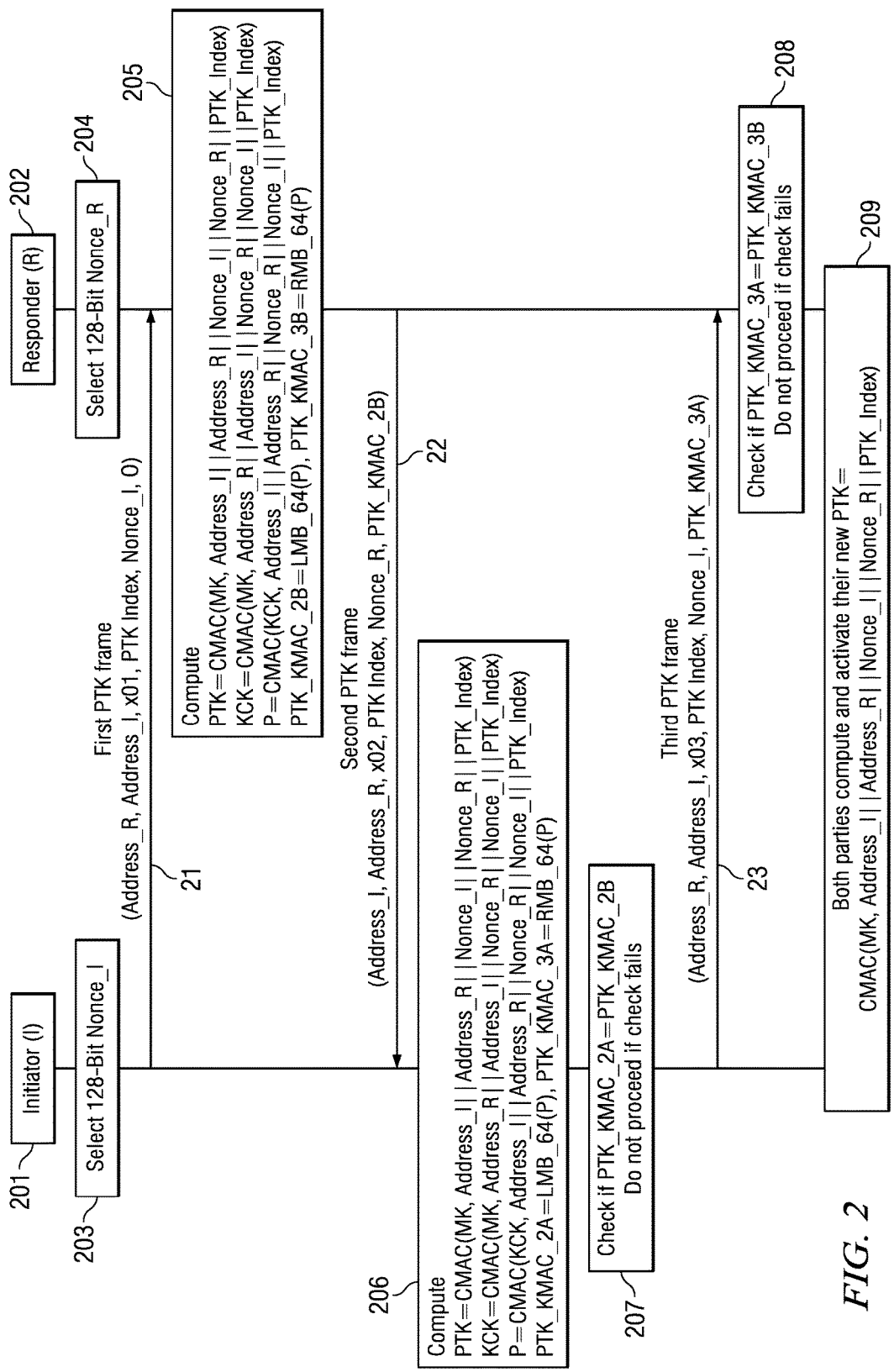
Figure 3:
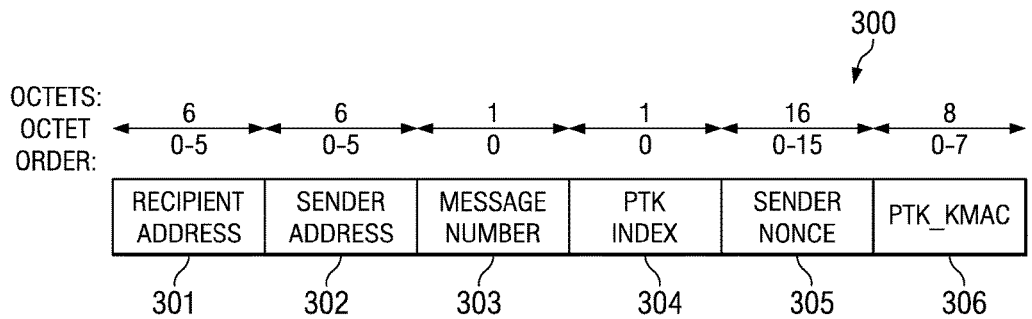
Figure 4:
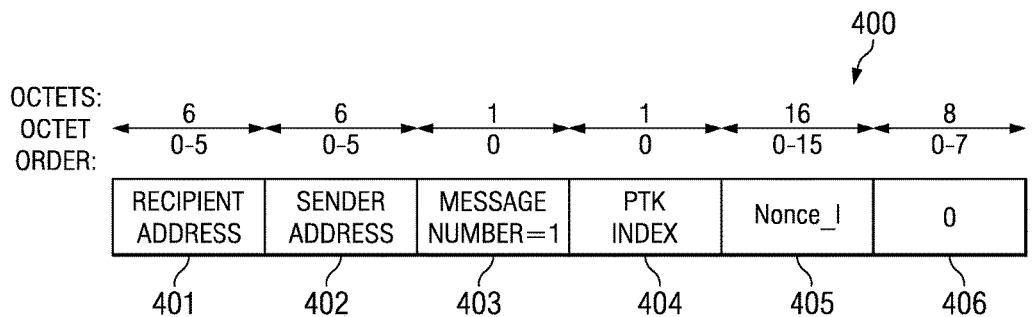
Figure 5:
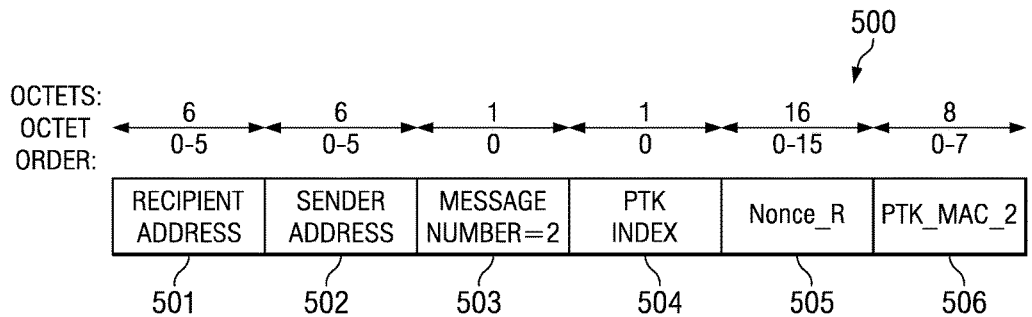
Figure 6:
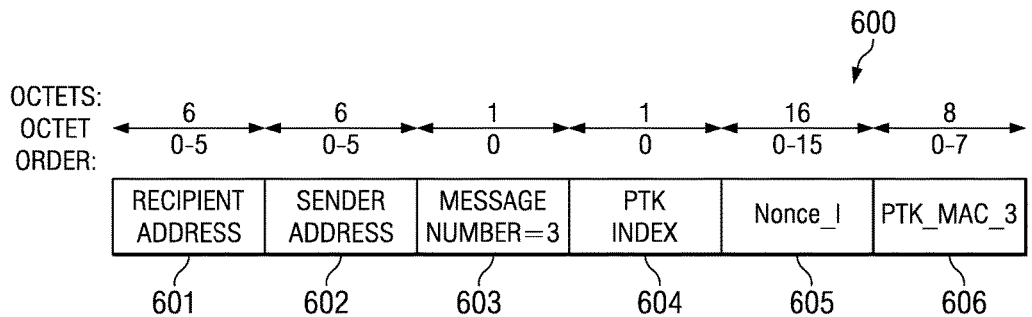
Figure 7:
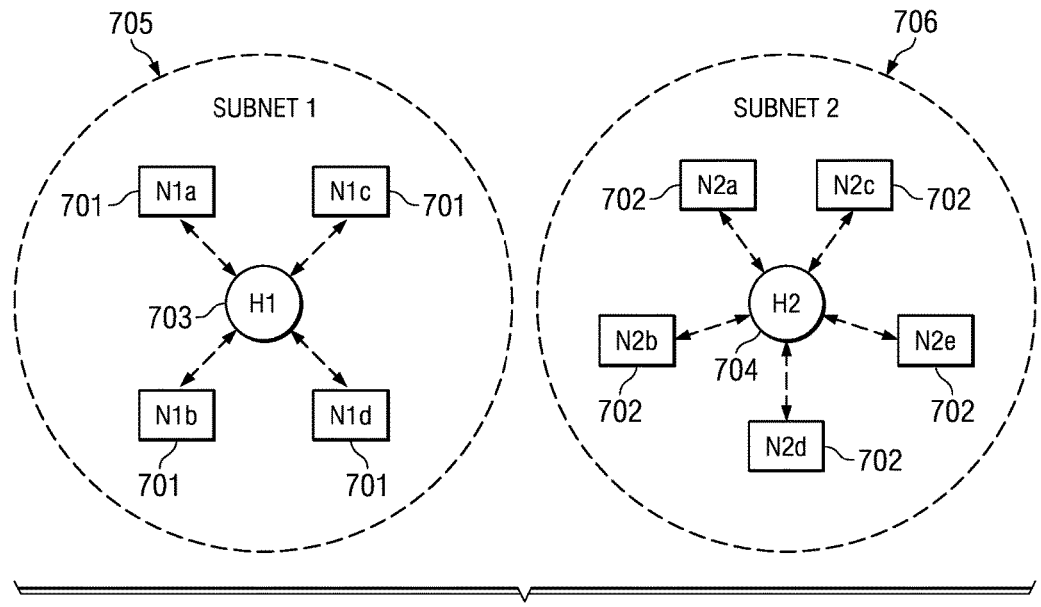
Figure 8:
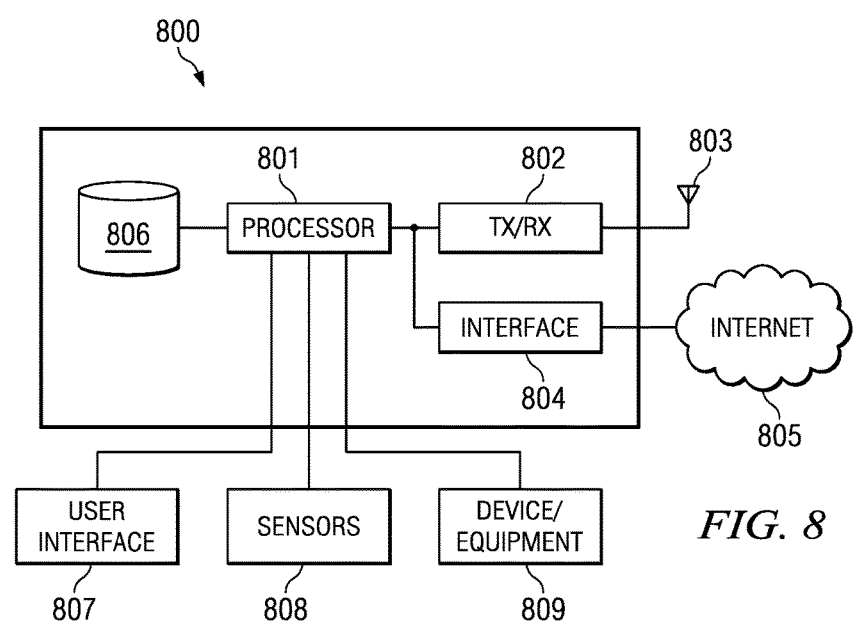

Having thus described the invention in general terms, reference will now be made to the accompanying drawings, wherein:

FIG. 1 is a block diagram illustrating one embodiment of a process for creating a pairwise temporal key;

FIG. 2 is a block diagram illustrating another embodiment of a process for creating a pairwise temporal key;

FIG. 3 illustrates an exemplary format for the payload of a PTK frame;

FIG. 4 illustrates an exemplary payload for a first PTK frame;

FIG. 5 illustrates an exemplary payload for a second PTK frame;

FIG. 6 illustrates an exemplary payload for a third second PTK frame;

FIG. 7 is a block diagram illustrating a network topology employing embodiments of the invention; and FIG. 8 is a block diagram of an exemplary embodiment of a device 800 for providing secure communications with another device using a PTK.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating one embodiment of a process for creating a pairwise temporal key (PTK). The process illustrated in FIG. 1 uses a HMAC-SHA-256 algorithm. For example, a keyed-hash message authentication code (HMAC) algorithm developed by National Institute of Standards and Technology (NIST) and described in Federal Information Processing Standard (FIPS) publication PUB 198 may be used with a Secure Hash Algorithm (SHA), such as SHA-256 specified in FIPS publication 180-2, in the PTK generation procedure of FIG. 1.

The parties, Initiator 101 and Responder 102, may be any devices or components that intend to communicate secure information via a wireless or wireline connection. Initiator 101 and Responder 102 have a shared master key (MK). The shared master key may have been pre-shared with the parties or jointly established by the parties.

Initiator 101 selects a nonce, designated as Nonce_I, in step 103 for use in the PTK formation process. Responder 102 also selects a nonce, designated as Nonce_R, in step 104. Nonce_I and Nonce_R may be, for example, a 128-bit integer randomly drawn with a uniform distribution over the interval $(0, 2^{128})$.

Initiator 101 sends a first PTK frame 11 to Responder 102 to begin the PTK generation procedure. The first PTK frame 11 comprises the addresses of Responder 102 (Address_R) and Initiator 101 (Address_I), a message number field (with the bits set to "1" representing the first message of the procedure), a PTK Index, the value of Nonce_I, and a key message authentication code (KMAC) field (set to "0" for the first message of the procedure). PTK frame 11 may use the payload format illustrated below in FIG. 3 and FIG. 4 and having similar data fields.

Responder 102 sends a second PTK frame 12 to Initiator 101. The second PTK frame 12 comprises the parties' addresses (Address_I, Address_R), a message number field (with the bits set to "2" representing the second message in procedure), the PTK Index, the value of Nonce_R, and the KMAC field which is set to PTK_KMAC_2_B calculated in step 105 as given below. PTK frame 12 may use the payload format illustrated below in FIG. 3 and FIG. 5 and having similar data fields.

In steps 105 and 106, respectively, Responder 102 and Initiator 101 each compute the values of the session key (PTK), key confirmation key (KCK), and KMACs (PTK_KMAC_2_B and PTK_KMAC_3_B) using the following equations:

$$PTK = LMB\_128(H1), \quad (1)$$

and $$KCK = RMB\_128(H1), \quad (2)$$

where $$H1 = \text{HMAC-SHA-256}_{MK}(\text{Address\_I} \| \text{Address\_R} \| \text{Nonce\_I} \| \text{Nonce\_R} \| \text{PTK\_Index}), \quad (3)$$

$$PTK\_KMAC\_2\_B = LMB\_128(H2),$$
$$PTK\_KMAC\_2\_A = LMB\_128(H2), \quad (4)$$

and $$PTK\_KMAC\_3\_B = RMB\_128(H2),$$
$$PTK\_KMAC\_3\_A = RMB\_128(H2), \quad (5)$$

where $$H2 = \text{HMAC-SHA-256}_{KCK}(\text{Address\_I} \| \text{Address\_R} \| \text{Nonce\_I} \| \text{Nonce\_R} \| \text{PTK\_Index}). \quad (6)$$

Here, the bit-string truncation functions LMB_n(S) and RMB_n(S) designate the n leftmost and the n rightmost bits of the bit string S, respectively. The sign ∥ denotes concatenation of bit strings from the designated fields of PTK frame 11 and PTK frame 12, which are converted according to FIPS Pub 180-2.

Keyed hash computation (3) produces a 256-bit number for a first and a second message authentication code (MAC) each of 128 bits. The first MAC is used as the PTK and is obtained from the 128 leftmost bits of the keyed hash result H1. The second MAC is used as the KCK and is obtained from the 128 rightmost bits of H1.

A third and a fourth MAC are generated from the same keyed hash function applied under key KCK in place of MK in Equation (6). The third MAC is used as a first KMAC representing PTK_KMAC_2_B and PTK_KMAC_2_A and is obtained from the 128 leftmost bits of the keyed hash result H2. The fourth MAC is used as a second KMAC representing PTK_KMAC_3_B and PTK_KMAC_3_A and is obtained from the 128 rightmost bits of H2.

In step 107, Initiator 101 compares PTK_KMAC_2_A (calculated in step 106) to PTK_KMAC_2_B (received from Responder 102 in second PTK frame 12) and evaluates if they match. PTK_KMAC_2_A and PTK_KMAC_2_B will match only if Initiator 101 and Responder 102 used the same master key (MK) to calculate H1 and hence H2. If PTK_KMAC_2_A and PTK_KMAC_2_B do not match, then Initiator 101 does not proceed with the PTK creation procedure beyond step 107.

If PTK_KMAC_2_A matches PTK_KMAC_2_B, then Initiator 101 treats the Responder's true identity as authenticated and sends a third PTK frame 13 to Responder 102. The third PTK frame 13 comprises the parties' addresses (Address_I, Address_R), a message number field (with the bits set to "3" representing the third message in procedure), the PTK Index, the value of Nonce_I, and the KMAC field which is set to PTK_KMAC_3_A calculated as given in step 106 above. PTK frame 13 may use the payload format illustrated below in FIG. 3 and FIG. 6 and having similar data fields.

In step 108, upon receipt of third PTK frame payload 13, Responder 102 compares PTK_KMAC_3_A (received from Initiator 101 in third PTK frame 13) and PTK_KMAC_3_B (calculated by Responder 102 in step 105) and evaluates if they match. Like the comparison of PTK_KMAC_2_A and PTK_KMAC_2_B, PTK_KMAC_3_A and PTK_KMAC_3_B will match only if Initiator 101 and Responder 102 used the same master key (MK) to calculate H1 and hence H2. If PTK_KMAC_3_A and PTK_KMAC_3_B do not match, then Initiator 101 does not proceed with the PTK creation procedure beyond step 108.

If PTK_KMAC_3_A matches PTK_KMAC_3_B in step 108, then Responder 102 treats the Initiator's true identity as authenticated. The PTK creation procedure is now completed, and the PTK calculated in steps 105 and 106, respectively, have the same value which can then be used to secure subsequent messages exchanged between the Initiator and the Responder.

FIG. 2 is a block diagram illustrating another embodiment of a procedure for creating a pairwise temporal key. In the procedure illustrated in FIG. 2, a cipher-based message authentication code (CMAC) algorithm is used in place of the HMAC algorithm used in FIG. 1. The CMAC algorithm specified in NIST Special Publication 800-38B, with the AES forward cipher function under a 128-bit key as specified in FIPS Pub 197, may be used to compute message authentication codes (MAC) representing the keys and key message authentication codes (KMAC) needed in the pairwise temporal key (PTK) generation procedure. The functional notation CMAC(K, M) represents the 128-bit output of the CMAC applied under key K to message M based on the AES forward cipher function.

Initiator 201 selects Nonce_I in step 203, and Responder 202 selects Nonce_R in step 204. Initiator 201 and Responder 202 have a shared master key (MK). The shared master key may have been pre-shared with the parties or jointly established by the parties. Initiator 201 initiates the PTK creation procedure by transmitting first PTK frame 21 to the Responder 202. The contents of the first PTK frame 21 are similar to those of the first PTK frame 11 as discussed above in connection with FIG. 1.

Responder 202 transmits a second PTK frame 22 to Initiator 201. The contents of the second PTK frame 22 are similar to those of the second PTK frame 12 in FIG. 1, with the KMAC field set to the value of PTK_KMAC_2B calculated in step 205 as given below.

In step 206, upon receipt of second PTK frame 22, Initiator 101 computes values for the variables KCK, PTK_KMAC_2A, and PTK_KMAC_3A using the equations listed in equations (7)-(10) above.

In steps 205 and 206, respectively, Responder 202 and Initiator 201 each compute the values of the session key (PTK), key confirmation key (KCK), and KMACs (PTK_KMAC_2B and PTK_KMAC_3B) using the following equations:

$$PTK=CMAC(MK,Address\_I\|Address\_R\|Nonce\_I\-\|Nonce\_R\|PTK\_Index), \quad (7)$$

$$KCK=CMAC(MK,Address\_R\|Address\_I\|Nonce\_R\-\|Nonce\_I\|PTK\_Index); \quad (8)$$

and $$PTK\_KMAC\_2B=LMB\_64(P),$$
$$PTK\_KMAC\_2A=LMB\_64(P), \quad (9)$$

$$PTK\_KMAC\_3B=RMB\_64(P),$$
$$PTK\_KMAC\_3A=RMB\_64(P), \quad (10)$$

where $$P=CMAC(KCK,Address\_I\|Address\_R\|Nonce\_R\-\|Nonce\_I\|PTK\_Index). \quad (11)$$

CMAC computation (7) produces a 128-bit number for a first MAC, which is used as the PTK to be created. CMAC computation (8) produces another 128-bit number for a second MAC, which is used as the KCK for subsequent KMAC computations in Equations (9)-(10). CMAC computation (10) produces yet another 128-bit number for a third and a fourth MAC. The third MAC is used as a first KMAC representing PTK_KMAC_2B and PTK_KMAC_2A and is obtained from the 64 leftmost bits of the CMAC result P. The fourth MAC is used as a second KMAC representing PTK_KMAC_3B and PTK_KMAC_3A and is obtained from the 64 rightmost bits of P.

In step 207, Initiator 201 compares PTK_KMAC_2A (calculated in step 206) to PTK_KMAC_2B (received from Responder 202 in second PTK frame 22). Initiator 201 evaluates whether these values match, which can only occur if both the Initiator and Responder used the same master key (MK) to calculate KCK and hence P. If PTK_KMAC_2A and PTK_KMAC_2B do not match, then Initiator 201 does not proceed with the PTK creation procedure beyond step 207.

If PTK_KMAC_2A and PTK_KMAC_2B match, then Initiator 201 treats the Responder's true identity as authenticated and sends a third PTK frame 23 to Responder 202 to complete the PTK creation procedure. The contents of third PTK frame 23 are similar to those of the third PTK frame 13 in FIG. 1, with the KMAC field set to PTK_KMAC_3A as calculated in step 206 above.

In step 208, Responder 202 compares PTK_KMAC_3A (received in third PTK frame 23) to PTK_KMAC_3B (calculated by Responder 202 in step 205) and evaluates if they match. If PTK_KMAC_3A and PTK_KMAC_3B do not match, then responder 602 does not proceed with the PTK creation procedure beyond step 208.

If PTK_KMAC_3A and PTK_KMAC_3B match in step 208, Responder 202 treats the Initiator's true identity as authenticated. The PTK creation procedure is now completed, and the PTK calculated in steps 205 and 206, respectively, have the same value which can then be used to secure subsequent messages exchanged between the Initiator and the Responder.

FIG. 3 illustrates an exemplary format for the payload 300 of a PTK frame. The PTK frame is exchanged between two devices to create a PTK based on a shared master key (MK). Recipient Address field 301 is set to the MAC address of the recipient of the current frame. Sender Address field 302 is set to the MAC address of the sender of the current frame. Message Number field 303 is set to the number of this PTK frame within the current PTK creation procedure. PTK Index field 304 identifies the current PTK that is being created. PTK Index field 304 is set by the Initiator in the first PTK frame transmitted in a current PTK creation procedure. The same PTK Index field value is used in all the subsequent PTK frames exchanged for that current PTK creation procedure. Accordingly, all related PTK frames have the same PTK Index. In one embodiment, if no PTK was previously created between the Initiator and Responder, then PTK Index field 304 is set to "0." Otherwise, PTK Index field 304 is set to the value of "1" minus the PTK Index field value last used to successfully create a PTK between the two devices (e.g. PTK Index=1−PTK Index$_{LAST}$). Accordingly, PTK Index field 304 takes on a value of either "0" or "1."

Sender Nonce field 305 is set to a statistically unique number per sender per PTK creation procedure. In one embodiment, in the first and second PTK frames of the current PTK creation procedure, Sender Nonce 305 is set afresh and independently by the respective sender to an integer randomly drawn with a uniform distribution over the interval (0, $2^{128}$). In the third PTK frame of the procedure, Sender Nonce 305 is set to the value contained in the first PTK frame. Initiator 601 and responder 602 independently generate a new 128-bit cryptographic random number (Nonce_I and Nonce_R, respectively) as their Sender Nonce to use in the PTK creation procedure.

PTK_KMAC field 306 is set to a key message authentication code (KMAC) that is computed with certain fields of the PTK frames in the current PTK creation procedure, for example, as described in connection with FIG. 1 or FIG. 2.

FIG. 4 illustrates an exemplary payload 400 for a first PTK frame. The fields of first PTK frame payload 400 correspond to the fields discussed above with respect to FIG. 3. Recipient Address field 401 is set to the MAC address for the Responder. Sender Address field 402 is set to the MAC address for the Initiator. Because this is the first PTK frame, Message Number field 403 is set to "1." PTK Index field 404 is set to either "1" or "0" depending upon how many times the devices have previously performed the PTK creation procedure, as discussed above with respect to PTK Index field 304. Sender Nonce field 405 is set to the value of Nonce_I selected by the Initiator. PTK_KMAC field 406 is set to "0" because this is the first PTK frame of the PTK creation procedure.

FIG. 5 illustrates an exemplary payload 500 for a second PTK frame. Recipient Address field 501 is set to the MAC address for the Initiator. Sender Address field 502 is set to the MAC address for the Responder. Because this is the second PTK frame of the current procedure, Message Number field 503 is set to "2." PTK Index field 504 is set to the same value as used in PTK Index field 404 of first PTK frame payload 400. Sender Nonce field 505 is set to the value of Nonce_R selected by the Responder. PTK_MAC_2 field 506 is set to a first KMAC calculated by the Responder (e.g., PTK_KMAC_2_B or PTK_KMAC_2B in the previous examples).

FIG. 6 illustrates an exemplary payload 1000 for the third PTK frame. Recipient Address field 600 is set to the MAC address for the Responder. Sender Address field 602 is set to the MAC address for the Initiator. Because this is the third PTK frame of the current procedure, Message Number field 603 is set to "3." PTK Index field 604 is set to the same value as used in PTK Index field 404 of first PTK frame payload 400. Sender Nonce field 605 is set to the value of Nonce_I. PTK_MAC_3 field 606 is set to a second KMAC calculated by the Initiator (e.g., PTK_KMAC_3_B or PTK_KMAC_3B in the previous examples).

FIG. 7 is a block diagram illustrating a network topology employing embodiments of the invention. Devices 701, 702 and hubs 703, 704 are organized into logical sets, referred to as subnets. In the illustrated embodiment, there is only one hub in a subnet, but the number of devices in a subnet may vary. For example, subnet 1 705 comprises hub 703 and plurality of devices 701, and subnet 2 706 comprises hub 704 and plurality of devices 702. In one embodiment, data is exchanged directly between the devices and their respective hub—i.e. within the same subnet only. In another embodiment of the invention, data may be exchanged between different subnets. The hub and devices may communicate using a wireless or wireline connection. An individual device and its corresponding hub may create a pairwise temporal key (PTK) or session key using the procedures illustrated in FIGS. 1 and 2. The session key may then be used to secure communications between the device and hub.

FIG. 8 is a block diagram of an exemplary embodiment of a device 800 for providing secure communications with another device using a PTK. Device 800 may be used as a node 701, 702 and/or a hub 703, 704 in FIG. 7. In one embodiment, device 800 is a hub, gateway, or controller controlling and communicating with one or more devices. In other embodiments, device 800 is a node in communication with a hub, gateway, controller or other devices. Processor 801 processes data to be exchanged with other devices via transceiver 802 and antenna 803 and/or via wireline interface 804 coupled to Internet or another network 805. Processor 801 may be a software, firmware, or hardware based device. Processor 801 may compute a pairwise temporal key (PTK), key confirmation key (KCK), or key message authentication code (KMAC). Processor 801 may also generate and process messages sent to, and received from, another device during a PTK generation procedure.

Memory 806 may be used to store cryptographic data, such as, master key (MK), pairwise temporal key (PTK), key confirmation key (KCK), and key message authentication code (KMAC). For such storage, memory 806 is secured from unauthorized access. Memory 806 may also be used to store computer program instructions, software and firmware used by processor 801. It will be understood that memory 806 may be any applicable storage device, such as a fixed or removable RAM, ROM, flash memory, or disc drive that is separate from or integral to processor 801.

Device 800 may be coupled to other devices, such as user interface 807, sensors 808, or other devices or equipment 809. In one embodiment, device 800 is a low-power wireless device operating on, in, or around a human or non-human body to serve one or more applications, such as medical connections, consumer electronics, and personal entertainment. Device 800 may be adapted to operate in a body area network either as a device or as a hub controlling a plurality of devices. Sensors 808 may be used, for example, to monitor vital patient data, such as body temperature, heart rate, and respiration. Equipment 809 may be, for example, a monitor or other device that receives and analyzes signals, such as a patient's temperature, heart rate, and respiration, from another device. Alternatively, equipment 809 may be a device for providing a service to a patient, such as controlling an intravenous drip, respirator, or pacemaker.

When used as a device or hub in a body area network, the information transmitted or received by device 800 is likely to include sensitive and/or confidential medical information. Accordingly, it is important to secure any session established by device 800 to protect the data from unauthorized parties, such as an imposter or eavesdropper. The data transmitted or received by device 800 may also include control signals, such as signals to control distribution of medicine or operation of a respirator or pacemaker. It is important that only authorized signals are used to control equipment 809 and that other signals be rejected or ignored to prevent, for example, unauthorized adjustments to drug distribution or respirator operation. Message communications secured with a secret session key as described herein provide the necessary level of control for such a device.

It will be understood that the subnets 705, 706 in FIG. 7 and device 800 in FIG. 8 are presented for illustrative purposes only and are not intended to limit the scope of the systems or devices that are capable of employing the session key generation procedure described herein. Any two devices in wireless or wireline communication with each other and each having a shared master key would be capable of generating a session key using the session key creation procedure.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of communication in a body area network, the method comprising:
   computing, by an initiator device, a first initiator key message authentication code including an initiator key confirmation key (KCK) by executing a cypher-based message authentication code (CMAC) on an initiator master key (MK) and a first string including an responder address (Address_R), an initiator address (Address_I), a responder nonce (Nonce_R), and an initiator nonce (Nonce_I), the first string for generating first and second pairwise temporal key (PTK) frames;

computing, by the initiator device, a second initiator key message authentication code (PTK_KMAC_2A) by executing the CMAC on the initiator KCK and a second string including the Address_I, the Address_R, the Nonce_I, and the Nonce_R associated with the first and second pairwise temporal key (PTK) frames; and verifying, by the initiator device, the PTK_KMAC_2A with a responder key message authentication code (PTK_KMAC_2B) received from the second PTK frame;

computing, by the initiator device, a third initiator key message authentication code (PTK_KMAC_3A) by executing the CMAC on the initiator KCK and the second string; and sending, by the initiator device, a third PTK frame including the Address_R, the Address_I, the Nonce_I, a PTK index, and the PTK_KMAC_3A.

2. The method of claim 1, further comprising:
generating, by an initiator device prior to the computing the first initiator key message authentication code, the first PTK frame including the Address_R, the Address_I, the Nonce_I, and the PTK index; and
receiving, by the initiator device prior to the computing the first initiator key message authentication code, the second PTK frame including the Address_I, the Address_R, a responder nonce (Nonce_R), the PTK index, and the PTK_KMAC_2B.

3. The method of claim 2, further comprising:
computing, by the initiator device, the PTK by executing the CMAC on the initiator MK and the second string when the PTK_KMAC_2A is equal to the PTK_KMAC_2B.

4. The method of claim 1, wherein:
the executing the CMAC on the initiator KCK and the second string creates P sequence;
the P sequence includes 64 leftmost bits (LMB) with the PTK_KMAC_2A; and
the P sequence includes 64 rightmost bits (RMB) with the PTK_KMAC_3A.

5. The method of claim 1, wherein:
the first string includes:
the Nonce_R occupying lower bit positions than Address_I; and
the PTK index occupying lower bit positions than Nonce_I; and
the second string includes:
the Nonce_I occupying lower bit positions than Address_R; and
the PTK index occupying lower bit positions than Nonce_R.

6. The method of claim 1, further comprising:
setting, by the initiator device, the PTK index to a binary value of 0 when before creating the PTK; and
inverting, by the initiator device, the binary value of the PTK index each time the PTK is created.

7. An initiator device for use in a body area network:
a processor; and
a memory coupled to the processor, the memory storing program instructions, which when implemented by the processor, cause the processor to perform an operation including:
computing a first initiator key message authentication code including an initiator key confirmation key (KCK) by executing a cypher-based message authentication code (CMAC) on an initiator master key (MK) and a first string including an responder address (Address_R), an initiator address (Address_I), a responder nonce (Nonce_R), and an initiator nonce (Nonce_I), the first string for generating first and second pairwise temporal key (PTK) frames;

computing a second initiator key message authentication code (PTK_KMAC_2A) by executing the CMAC on the initiator KCK and a second string including the Address_I, the Address_R, the Nonce_I, and the Nonce_R associated with the first and second pairwise temporal key (PTK) frames; and verifying the PTK_KMAC_2A with a responder key message authentication code (PTK_KMAC_2B) received from the second PTK frame;

computing a third initiator key message authentication code (PTK_KMAC_3A) by executing the CMAC on the initiator KCK and the second string; and sending a third PTK frame including the Address_R, the Address_I, the Nonce_I, a PTK index, and the PTK_KMAC_3A.

8. The initiator device of claim 7, wherein the operation includes:
generating, prior to the computing the first initiator key message authentication code, the first PTK frame including the Address_R, the Address_I, the Nonce_I, and the PTK index; and
receiving, prior to the computing the first initiator key message authentication code, the second PTK frame including the Address_I, the Address_R, a responder nonce (Nonce_R), the PTK index, and the PTK_KMAC_2B.

9. The initiator device of claim 8, wherein the operation includes:
computing the PTK by executing the CMAC on the initiator MK and the second string when the PTK_KMAC_2A is equal to the PTK_KMAC_2B.

10. The initiator device of claim 9, wherein:
the executing the CMAC on the initiator KCK and the second string creates P sequence;
the P sequence includes 64 leftmost bits (LMB) with the PTK_KMAC_2A; and
the P sequence includes 64 rightmost bits (RMB) with the PTK_KMAC_3A.

11. The initiator device of claim 7, wherein:
the first string includes:
the Nonce_R occupying lower bit positions than Address_I; and
the PTK index occupying lower bit positions than Nonce_I; and
the second string includes:
the Nonce_I occupying lower bit positions than Address_R; and
the PTK index occupying lower bit positions than Nonce_R.

12. The initiator device of claim 7, wherein the operation includes:
setting the PTK index to a binary value of 0 when before creating the PTK; and
inverting the binary value of the PTK index each time the PTK is created.

13. A method of communication in a body area network, the method comprising:
computing, by a responder device, a responder key confirmation key (KCK) by executing a cypher-based message authentication code (CMAC) on an responder master key (MK) and a first string including a responder address (Address_R), an initiator address (Address_I), a responder nonce (Nonce_R), and an initiator nonce (Nonce_I), the first string derived from a first pairwise temporal key (PTK) frame;

computing, by the responder device, a responder key message authentication codes (PTK_KMAC_2B) and (PTK_KMAC_3B) by executing the CMAC on the responder KCK and a second string including the Address_I, the Address_R, the Nonce_I, and the Nonce_R;

sending, by the responder device, a second PTK frame including the Address_I, the Address_R, a responder nonce (Nonce_R), the PTK index, and the PTK_KMAC_2B; and verifying, by the responder device, an initiator key message authentication code (PTK_KMAC_3A) with the PTK_KMAC_3B.

14. The method of claim 13, further comprising:
computing, by the responder device, the PTK by executing the CMAC on the responder MK and the second string when the PTK_KMAC_3A is equal to the PTK_KMAC_3B.

15. The method of claim 13, wherein:
the executing the CMAC on the responder KCK and the second string creates a P sequence of 128 bits;
the P sequence includes 64 leftmost bits (LMB) with the PTK_KMAC_2A; and
the P sequence includes 64 rightmost bits (RMB) with the PTK_KMAC_3A.

16. The method of claim 13, wherein:
the first string includes:
 the Nonce_R occupying lower bit positions than Address_I; and
 the PTK index occupying lower bit positions than Nonce_I; and
the second string includes:
 the Nonce_I occupying lower bit positions than Address_R; and
 the PTK index occupying lower bit positions than Nonce_R.

17. The method of claim 13, further comprising:
setting, by the responder device, the PTK index to a binary value of 0 when before creating the PTK; and
inverting, by the responder device, the binary value of the PTK index each time the PTK is created.

18. An responder device for use in a body area network:
a processor; and
a memory coupled to the processor, the memory storing program instructions, which when implemented by the processor, cause the processor to perform an operation including:
 computing, by a responder device, a responder key confirmation key (KCK) by executing a cypher-based message authentication code (CMAC) on an responder master key (MK) and a first string including a responder address (Address_R), an initiator address (Address_I), a responder nonce (Nonce_R), and an initiator nonce (Nonce_I), the first string derived from a first pairwise temporal key (PTK) frame;
 computing, by the responder device, a responder key message authentication codes (PTK_KMAC_2B) and (PTK_KMAC_3B) by executing the CMAC on the responder KCK and a second string including the Address_I, the Address_R, the Nonce_I, and the Nonce_R;
 sending, by the responder device, a second PTK frame including the Address_I, the Address_R, a responder nonce (Nonce_R), the PTK index, and the PTK_KMAC_2B; and
 verifying, by the responder device, an initiator key message authentication code (PTK_KMAC_3A) with the PTK_KMAC_3B.

19. The responder device of claim 18, wherein the operation includes:
computing, by the responder device, the PTK by executing the CMAC on the responder MK and the second string when the PTK_KMAC_3A is equal to the PTK_KMAC_3B.

20. The responder device of claim 18, wherein:
the executing the CMAC on the responder KCK and the second string creates a P sequence of 128 bits;
the P sequence includes 64 leftmost bits (LMB) with the PTK_KMAC_2A; and
the P sequence includes 64 rightmost bits (RMB) with the PTK_KMAC_3A.

21. The responder device of claim 18, wherein:
the first string includes:
 the Nonce_R occupying lower bit positions than Address_I; and
 the PTK index occupying lower bit positions than Nonce_I; and
the second string includes:
 the Nonce_I occupying lower bit positions than Address_R; and
 the PTK index occupying lower bit positions than Nonce_R.

22. The responder device of claim 18, wherein the operation includes:
setting, by the responder device, the PTK index to a binary value of 0 when before creating the PTK; and
inverting, by the responder device, the binary value of the PTK index each time the PTK is created.

* * * * *